United States Patent
Battisha et al.

(10) Patent No.: US 8,028,061 B2
(45) Date of Patent: Sep. 27, 2011

(54) METHODS, SYSTEMS, AND COMPUTER PROGRAM PRODUCTS EXTRACTING NETWORK BEHAVIORAL METRICS AND TRACKING NETWORK BEHAVIORAL CHANGES

(75) Inventors: Mohamed Battisha, Plantation, FL (US); Satya Samineni, Sunrise, FL (US); Kevin Richardson, Plantation, FL (US); Salah Serghini, Sunrise, FL (US); Hanafy Meleis, Weston, FL (US)

(73) Assignee: Trendium, Inc., Fort Lauderdale, FL (US)

( * ) Notice: Subject to any disclaimer, the term of this patent is extended or adjusted under 35 U.S.C. 154(b) by 1013 days.

(21) Appl. No.: 11/874,722

(22) Filed: Oct. 18, 2007

(65) Prior Publication Data

US 2009/0106174 A1   Apr. 23, 2009

(51) Int. Cl.
*G06F 15/173* (2006.01)
(52) U.S. Cl. .................................................. 709/224
(58) Field of Classification Search .................. 709/224
See application file for complete search history.

(56) References Cited

U.S. PATENT DOCUMENTS

2005/0080893 A1* 4/2005 Castellanos et al. .......... 709/224
2008/0091766 A1* 4/2008 Briscoe et al. ................ 709/202

* cited by examiner

*Primary Examiner* — Larry Donaghue

(74) *Attorney, Agent, or Firm* — Myers Bigel Sibley & Sajovec

(57) ABSTRACT

A network behavioral metric is extracted from a communication network based on a relevancy of the metric to network behavior by identifying a network metric x that is defined as a random variable that represents a quantitative measure of a network behavior accumulated over a period of time, selecting a network feature, generating a metric disintegration model for the network metric x comprising at least one normal behavior probability distribution function for the metric x for each value of the network feature, respectively, and at least one abnormal behavior probability distribution function for the metric x for each value of the network feature, respectively, increasing a number of the values of the metric x that indicates normal network behavior and/or abnormal network behavior based on the metric disintegration model, and selecting a network metric x as a behavioral metric based on a relevancy η of the network metric x to the network behavior. Embodiments for tracking network behavioral changes are also provided.

10 Claims, 8 Drawing Sheets

METHODS, SYSTEMS, AND COMPUTER PROGRAM PRODUCTS EXTRACTING NETWORK BEHAVIORAL METRICS AND TRACKING NETWORK BEHAVIORAL CHANGES

FIELD OF THE INVENTION

The present invention relates to communication networks and methods of operating the same, and, more particularly, to methods, system, and computer program products for analyzing network behavior.

BACKGROUND OF THE INVENTION

The dramatic increase in the number of network attacks and the degree of innovation that the attack methodologies use are evidence that existing network security mechanisms alone may not be enough to protect a network. Lack of attack correlation mechanisms before, during, and after the attacks may provide an excellent safeguard for the attack to be mysterious and for the attackers to remain anonymous. In addition to this challenge, CIOs and CSOs are demanding actionable intelligence to help their security teams pursue an effective forensic analysis of any abnormal behavior in their networks while it is underway regardless of whether or not the exact type of abnormality has been seen before. Such a demand coupled with the dynamic behavior of the network and the dramatic increase in network connectivity, complexity, and activities, has introduced several challenges for effective network security and forensic systems. A Network Behavior Anomaly Detection (NBAD) system that understands the network behavior and dynamically adapts to the changes in the network behavioral patterns has become one of the main contributing solutions to the given problem. The problem can be perceived from two different perspectives. The first perspective is related to the real time detection of potential abnormal network behavior. The second perspective is related to reduction of the data set the network forensic analysis will use for the identification of the abnormality source and the reconstruction of the abnormal patterns.

As the number of metrics that can be collected from the network can vary, the ability to select the right set of metrics that reflect the network behavior may introduce a major challenge in architecting an NBAD system. In addition, the ability to rely on a solid classification model to distinguish between the normal and the abnormal network behavior is another dimension of the given problem.

SUMMARY

In accordance with some embodiments of the present invention, a network behavioral metric is extracted from a communication network based on a relevancy of the metric to network behavior by identifying a network metric x that is defined as a random variable that represents a quantitative measure of a network behavior accumulated over a period of time, selecting a network feature, generating a metric disintegration model for the network metric x comprising at least one normal behavior probability distribution function for the metric x for each value of the network feature, respectively, and at least one abnormal behavior probability distribution function for the metric x for each value of the network feature, respectively, increasing a number of the values of the metric x that indicates normal network behavior and/or abnormal network behavior based on the metric disintegration model, and selecting a network metric x as a behavioral metric based on a relevancy $\eta$ of the network metric x to the network behavior;

wherein the relevancy $\eta$ is given as follows:

$$\eta = \frac{|\Phi_{sn}| + |\Phi_{sa}|}{|\Phi|}$$

$\Phi$ is a sample space of all possible values of x;
$\Phi_{sn}$ is a subset of $\Phi$ based on the values of x that indicates normal network behavior;
$\Phi_{sa}$ is a subset of $\Phi$ based on the values of x that indicates abnormal network behavior.

In other embodiments, the network metric x is selected from one of a plurality of metric categories comprising volume of network activity metrics, network performance characteristic metrics, network fault metrics, network element activity log metrics, and/or user audit log metrics.

In still other embodiments, the network feature is selected from one of a plurality of feature categories network specific features, network independent features, network exterior behavioral element features, and time machine features.

In still other embodiments, the method further comprises analyzing the network and its interfaces with external neighbors to identify behavioral elements, assigning each of the identified behavioral elements to one of the plurality of metric categories and/or plurality of feature categories, and identifying any parent-child relationships between behavioral elements in each of the plurality of metric categories and plurality of feature categories.

In still other embodiments, the method further comprises, for each behavioral element in the plurality of metric categories, examining each of the behavioral elements in each of the plurality of feature categories to determine if the examined feature category behavioral element can be used in the metric disintegration model for that metric category behavioral element.

In further embodiments of the present invention, network behavioral changes are tracked by selecting a network metric x that is defined as a random variable that represents a quantitative measure of a network behavior accumulated over a period of time, predicting a current value $F_t$ of the network metric x using an Adaptive Exponentially Weighted Moving-Average (AEWMA) formula as follows:

$F_t = F_{t-1} + \lambda_t e_t$, where $e_t = x_t - F_{t-1}$, and $\lambda_t$ is a weight parameter;

determining an upper and a lower control limit for network metric x based on a previously estimated value $F_{t-1}$ of the network metric x, observing the current value for the network metric $x_t$, determining that the network's behavior is normal if the current value for the network metric $x_t$ does not fall outside the upper and the lower control limits, and determining that the network's behavior is abnormal if the current value for the network metric $x_t$ falls outside the upper and the lower control limits.

In still further embodiments, the method further comprises generating a Tracking Signal ($TS_t$) based on the forecasting error, determining a backward difference $\nabla TS_t$ as follows if the network's behavior is determined to be normal:

$\nabla TS_t = TS_t - TS_{t-1}$;

determining if the backward difference $\nabla TS_t$ switches signs from a previously generated backward difference, setting the weight parameter $\lambda_t$ to $TS_t$ if backward difference switches signs, and setting the weight parameter $\lambda_t$ to one of $\{\lambda_{tp}$ or $\lambda_t$ or $\lambda_{tn}\}$ so as to minimize $e_{tp}$, $e_t$, and $e_{tn}$ below:

$$F_{tp}=\lambda_{tp}e_t+F_{tp-1};$$

$$F_t=\lambda_t e_t+F_{t-1};$$

$$F_{tn}=\lambda tne_t+F_{tn-1};$$

where $\lambda_{tp}=(\lambda_t+\delta)$ and $\lambda_{tn}=(\lambda_t-\delta)$;
$F_{t-1}$ is a predicted current value of the network metric x;

$$e_{tp}=(x_t-F_{tp-1});$$

$$e_t=(x_t-F_{t-1});$$

$$e_{tn}=(x_t-F_{tn-1});$$

$\delta$ is selected from the set $\{0.25, 0.20, 0.15, 0.10, 0.05, 0.03, 0.00\}$.

In still further embodiments, $TS_t$ is given by the following equation:

$$TS_t = \left|\frac{E_t}{MAD_t}\right|;$$

where $E_t=\beta e_t+(1-\beta)E_{t-1};$ $$MAD_t=\beta|e_t|+(1-\beta)MAD_{t-1};$$

$0<\beta<1$.

In still further embodiments, the upper and the lower control limits for the network metric x are given by the following equation:

$$F_{t-1}\pm K_{TS}d_{t-1};$$

where $K_{TS}$ is a multiplication constant;

$$d_t=\gamma|x_t-F_{t-1}|+(1-\gamma)d_{t-1};$$

where $d_t$ is a predicted deviation, and $\gamma$ is a weight constant;

$0<\gamma<1.0$.

In still further embodiments, the method further comprises signaling that the network's behavior is abnormal when the network's behavior is determined to be abnormal, and reporting the abnormal period of network behavior upon determining that the network's behavior has returned to normal.

In still further embodiments, the method further comprises performing a real time analysis of traffic on the network responsive to the signal that the network's behavior is abnormal.

Although described primarily above with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
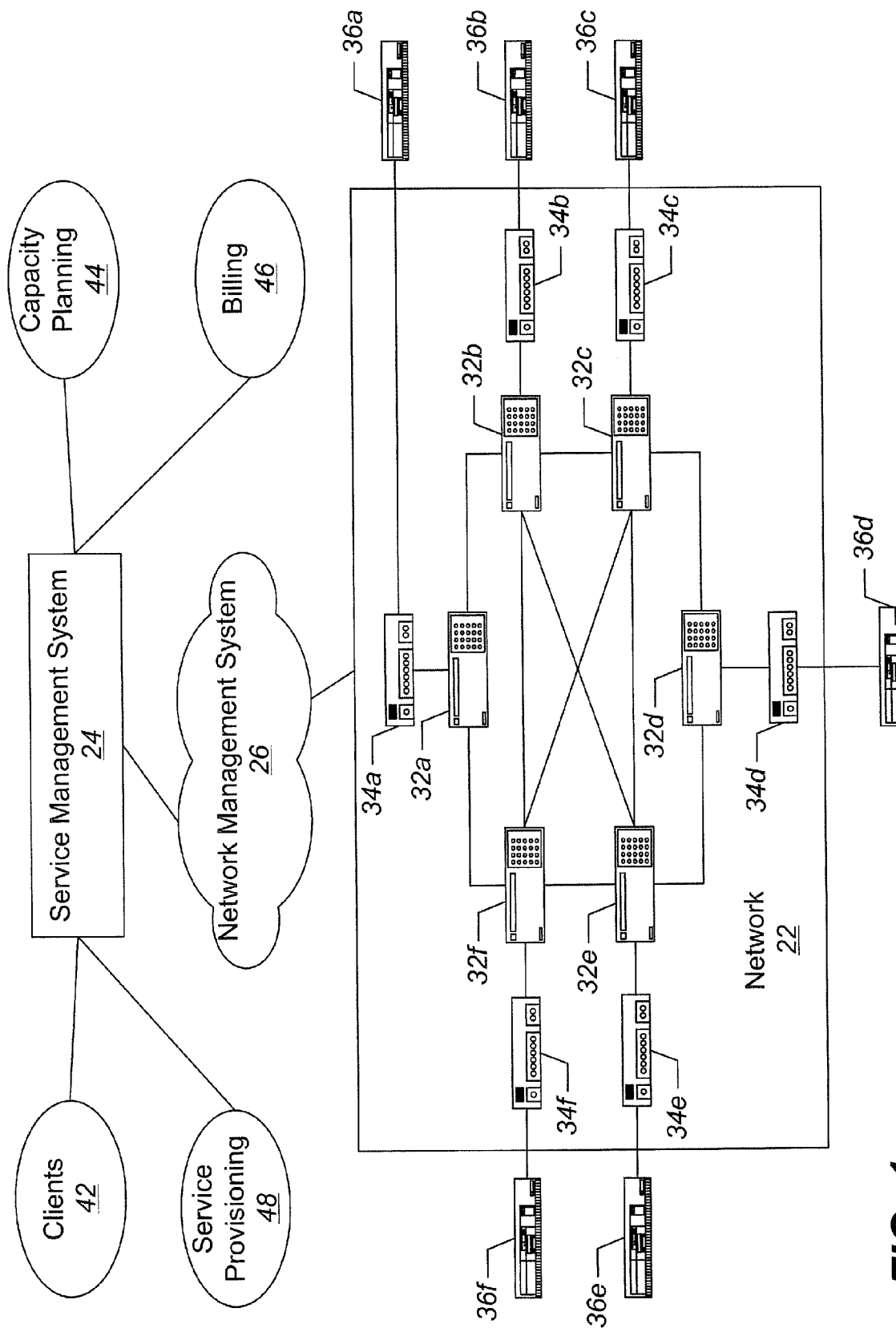
FIG. 1 illustrates a service/network management architecture for a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention may provide the ability to select meaningful metrics that can be used in tracking the network behavioral changes. This approach can be summarized as follows:

Provide a methodology for modeling the network behavior in terms of dynamic behavioral elements (metrics) and static behavioral elements (features)

Formulate a mathematical model for the relevancy between the network behavior and the network metrics.

Develop a metrics disintegration model to disintegrate the metrics based on the selected feature to increase the significance of the selected metrics to the network behavior.

Formulate a process for the construction and the adaptation of the metric disintegration tree based on the metrics and the features that can be acquired from any enterprise network.

Based on the selected metrics, an Adaptive Exponentially Weighted Moving Average (AEWMA) with a moving centerline control chart may be formulated to monitor changes in the network's behavior. This can be summarized as follows:

Formulate a methodology for the selection of the EWMA weight parameter based on Tracking Signals (TS).

Introduce a criterion based on the tracking signal difference operator to select the appropriate time to change the weight parameter Provide a formula for optimizing the weight parameter around the target to eliminate the noise effect on the predicted behavior.

Construct the AEWMA control limits for detecting the changes in the network behavior A signal that the network behavior has changed may trigger activation or deactivation of a deep real time inspection and retention of the network traffic. The retained data may be used for further association of forensic evidence to identify the source of abnormality and to reconstruct the abnormal scenario.

Referring now to FIG. 1, an exemplary service/network management system architecture, in accordance with some embodiments of the present invention, includes a network 22, a service management system 24, and a network management system 26 that may be used to interface the service management system 24 to the network 22. It will be understood that the network 22 may be embodied as various network types, in accordance with various embodiments of the present invention, including both wireless and/or wireline networks. The network 22 may include one or more core network elements 32$a$, 32$b$, 32$c$, 32$d$, 32$e$, and 32$f$ and one or more access network elements 34$a$, 34$b$, 34$c$, 34$d$, 34$e$, and 34$f$ as shown. The access network elements 34$a$, 34$b$, 34$c$, 34$d$, 34$e$, and 34$f$ comprise those network elements that are configured at the edge of the network 22 and provide access to the network 22 for access devices from another public or private network. Accordingly, the access network elements 34$a$, 34$b$, 34$c$, 34$d$, 34$e$, and 34$f$ may include one or more ports through which a user network interface (UNI) or network interface (NI) may be defined. As illustrated in FIG. 1, each access network element 34$a$, 34$b$, 34$c$, 34$d$, 34$e$, and 34$f$ is in communication with a one or more customer access devices 36$a$, 36$b$, 36$c$, 36$d$, 36$e$, and 36$f$ over one or more NIs.

The service management system 24 and/or network management system 26 may communicate with the access network elements 34$a$, 34$b$, 34$c$, 34$d$, 34$e$, and 34$f$ and/or the core network elements 32$a$, 32$b$, 32$c$, 32$d$, 32$e$, and 32$f$ to collect, for example, performance, configuration, topology, timing, and/or traffic data therefrom. The data collected by the service management system 24 and/or network management system 26 are stored in repositories for use by other applications. The repositories may, in some embodiments, be implemented as relational database management systems (RDBMS) that support the structured query language (SQL). It may be desirable to store the collected data in a SQL database to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the network 22 (e.g., determine whether the services provided by the network 22 are in conformance with an agreed upon quality of service). Capacity planning applications 44 may communicate with the service management system 24 to assist an administrator in shaping/configuring the topology/shape of the network 22 and/or to distribute traffic carried by the network 22. Billing applications 46 may communicate with the service management system 24 to generate bills based on analyses of the data collected from the network 22. Finally, service-provisioning applications 48 may communicate with the service management system 24 to facilitate the introduction of new services into the network 22.

The service management system 24 and/or data processing system(s) supporting the client applications 42, the capacity planning applications 44, the billing applications 46, and the service provisioning applications 48 may be configured with computational, storage, and control program resources for managing service quality, in accordance with some embodiments of the present invention. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems. In addition, the network management system 26 may be implemented as a single processor system, a multi-processor system, or even a network of stand-alone computer systems.

Although FIG. 1 illustrates an exemplary service/network management system architecture, it will be understood that the present invention is not limited to such a configuration but is intended to encompass any configuration capable of carrying out the operations described herein.

Figure 2:
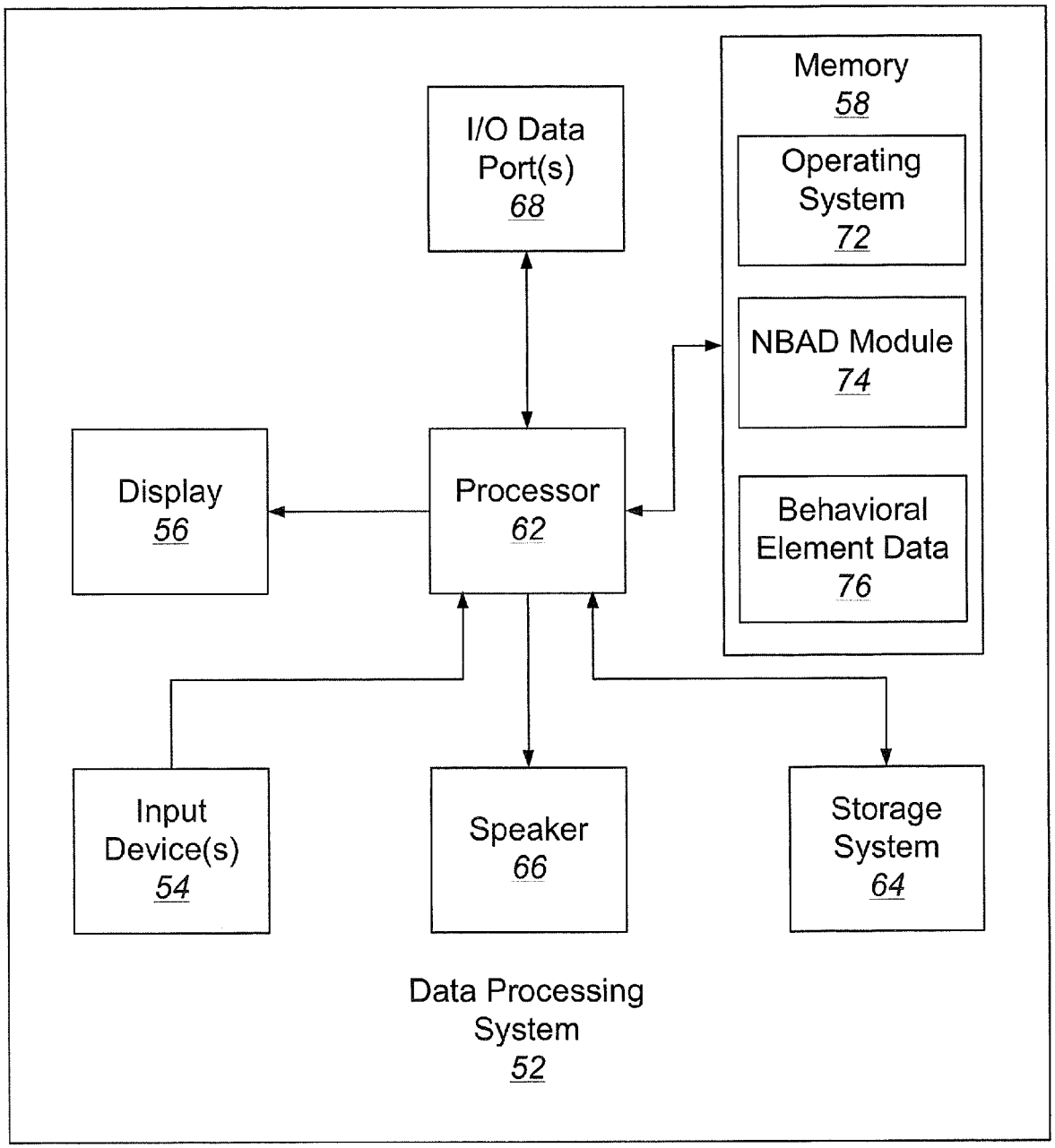
FIG. 2 is a block diagram of a data processing system that can be used to implement the network management system of FIG. 1 in accordance with some embodiments of the present invention.

With reference to FIG. 2, the network management system 26 may be embodied as a data processing system 52. Embodiments of the data processing system 52 may include input device(s) 54, such as a keyboard or keypad, a display 56, and a memory 58 that communicate with a processor 62. The data processing system 52 may further include a storage system 64, a speaker 66, and an input/output (I/O) data port(s) 68 that also communicate with the processor 62. The storage system 64 may include removable and/or fixed media, such as floppy disks, ZIP drives, hard disks, or the like, as well as virtual storage, such as a RAMDISK. The I/O data port(s) 68 may be used to transfer information between the data processing system 52 and another computer system or a network (e.g., the Internet). These components may be conventional components such as those used in many conventional computing devices, which may be configured to operate as described herein.

The processor 62 communicates with the memory 58 via an address/data bus. The processor 62 may be, for example, a commercially available or custom microprocessor. The memory 58 is representative of the overall hierarchy of memory devices containing the software and data used to manage the network in accordance with some embodiments of the present invention. The memory 58 may include, but is not limited to, the following types of devices: cache, ROM, PROM, EPROM, EEPROM, flash, SRAM, and DRAM.

As shown in FIG. 2, the memory 58 may hold three or more major categories of software and data: an operating system 72, a Network Behavior Anomaly Detection (NBAD) module 74, and a behavioral element data 76. The operating system 72 controls the operation of the network management system 26. In particular, the operating system 72 may manage the network management system's resources and may coordinate execution of programs by the processor 62. The operating system 72 may be configured to allow the software modules in the memory 58 to be implemented as an object-oriented system and may facilitate communication between the various software objects. The NBAD module 74 may be configured to facilitate the selection of meaningful network metrics that can be used in tracking network behavioral changes. The behavioral element data 76 represents the data associated with the various network metrics and features that can be used to model the network behavior.

Computer program code for carrying out operations of the network management system 26 and/or the data processing system 52 discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. In some embodiments, the computer program code may include commercially available applications and/or components provided by third parties. It will be further appreciated that the functionality of any or all of the program modules may also be implemented using discrete hardware components, one or more application specific integrated circuits (ASICs), or a programmed digital signal processor or microcontroller.

It will be understood that the NBAD module 74 and behavioral element data 76 are described herein as being implemented as part of the network management system 26 for purposes of illustration. Embodiments of the present invention are not limited to such an implementation as the NBAD module 74 and/or the behavioral element data 76 may be implemented as part of the service management system 24 or other data processing system that has access to data collected from the network 22 in accordance with various embodiments of the present invention. Moreover, the NBAD module 74 and/or the behavioral element data 76 may be spread across multiple data processing systems in accordance with other embodiments of the present invention.

Figure 3:
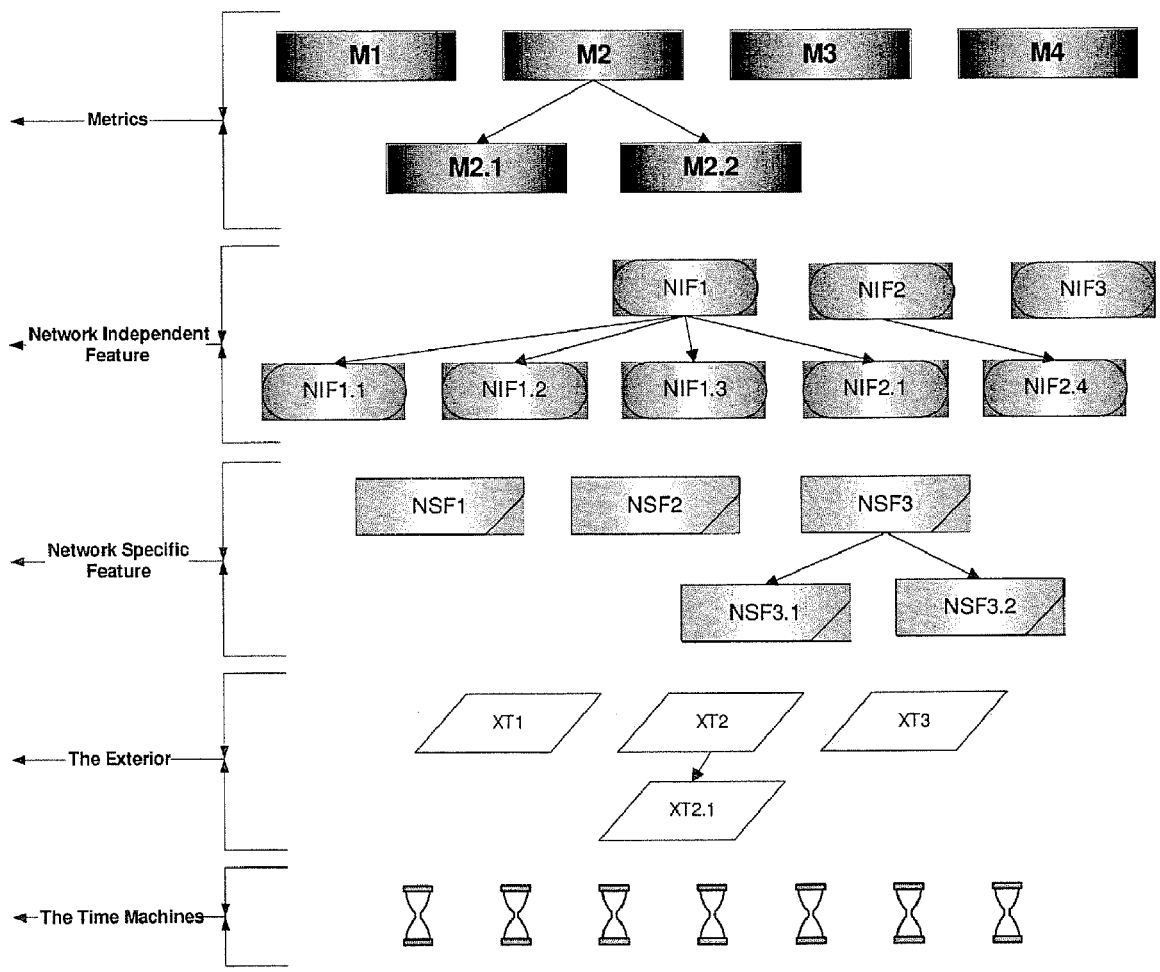
FIG. 3 is a block diagram that illustrates network behavioral element categories in accordance with some embodiments of the present invention.

Exemplary operations of the NBAD module 74 are described below. Referring now to FIG. 3, network behavioral elements may be broadly categorized as network metrics and network features in accordance with some embodiments of the present invention. The network features include static behavioral element features, exterior behavioral element features, and time machine features. The static behavioral element features include network specific features and network independent features.

The network dynamic behavioral elements change according to the usage of the network. The term network metrics is used to refer to these elements. A network metric has been defined as a random variable representing a quantitative measure accumulated over a period of time. These metrics may be classified according to their nature into five different categories:

1. The Volume of Network Activities
2. The Network Performance Characteristics
3. The Network Faults
4. The Network Element Activity Log
5. The User Audit Logs The static behavioral elements of the network are the features that may be used mainly for network setup and configuration. The term network feature is used to refer to these elements. The network features may be categorized into network independent features (NIF) and network specific features (NSF):

Network Specific Features: The network specific features are the features that may be configured and maintained by the network administrator.

Network Independent Feature: The network independent features are standardized features that have been instituted by global committees such as the Internet Engineering Task Force (IETF). The network hardware and software vendors develop their products to adhere to the proposed standard specification.

The network exterior behavioral elements may include the following:
- The network neighbors
  - The elements that manage the interaction between the network and its neighbors The time machines refer to the period of time in which the network activities took place. The time machines are used for analyzing the network behavior and its abnormality. Some network activities may be very time dependent. For example, extensive use of the exchange server at 9:00 AM is very regular in some enterprise networks; it may not be regular if the same activity took place at 9:00 PM. The weekly process of synchronizing and backing up servers may introduce huge network traffic and is considered normal if it the network administrator security and maintenance policies are adhered to; otherwise, it may be considered very suspicious.

The network behavior may be highly dependent on what can be collected from the network at a certain period of time. The network behavioral elements have been classified into five different categories as indicated above. The most significant category is the dynamic behavioral elements, which have been identified as network metrics. The other four categories are network features that can impact the distribution of the collected metrics. The network behavior may be classified into two states: normal and abnormal. The observed value of the collected metrics may provide a clear indication of network behavior in its different states.

To quantify the relevancy between a given network metric and the network behavior, a relevancy measure ($\eta$) has been identified to give a quantitative measurement of such a relationship:

$$\eta = \frac{|\Phi_{sn}| + |\Phi_{sa}|}{|\Phi|} \quad (1)$$

Assume 'x' is a random variable that represents the distribution of a network metric, then:

$\Phi$: is the sample space of all the possible values of 'x';
$\Phi_{sn}$: is a subset of $\Phi$ based on the values of 'x' that indicates normal behavior,
$\Phi_{sa}$: is a subset of $\Phi$ based on the values of 'x' that indicates abnormal behavior.

For example, consider a network metric 'x' that can have only five different values (a, b, c, d, e). A value of 'a' indicates a normal network behavior and value of 'c' indicates an abnormal network behavior. In this case, $\eta$ can be calculated as follow:

$$\eta = \frac{1+1}{5} = \frac{2}{5}$$

In other words, the given metric is 40% relevant to the network behavior.

The distribution theory deals with the way in which the signal and the noise are distributed. The performance of the classification algorithms that distinguishes between the signal and the noise distributions may be illustrated using the Receiver Operating Characteristic (ROC) curve. Since the introduction of the ROC, it has been used in several branches of computer science such as image processing and speech recognition.

Figure 4A:
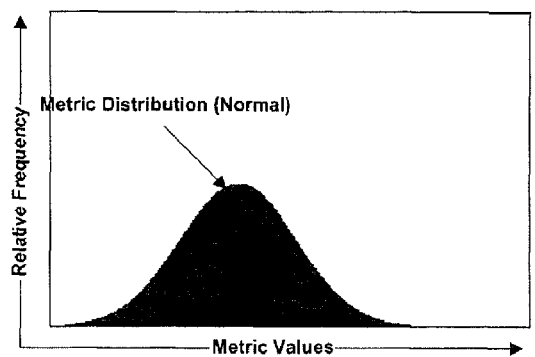
FIG. 4A is a graph that illustrates an example metric distribution based on normal network behavior in accordance with some embodiments of the present invention.
Figure 4B:
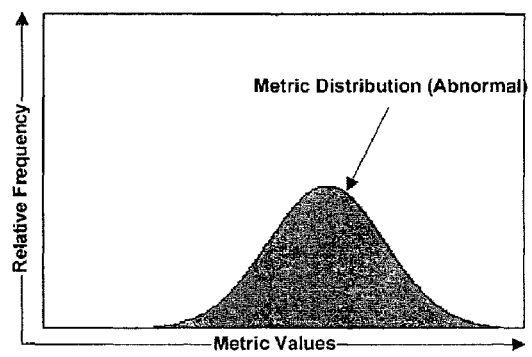
FIG. 4B is a graph that illustrates an example metric distribution based on abnormal network behavior in accordance with some embodiments of the present invention.
Figure 4C:
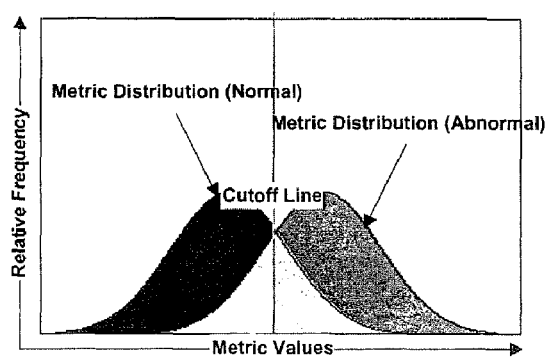
FIG. 4C is a graph that combines the two different distributions of FIGS. 4A and 4B into a single graph in accordance with some embodiments of the present invention.
Figure 4D:
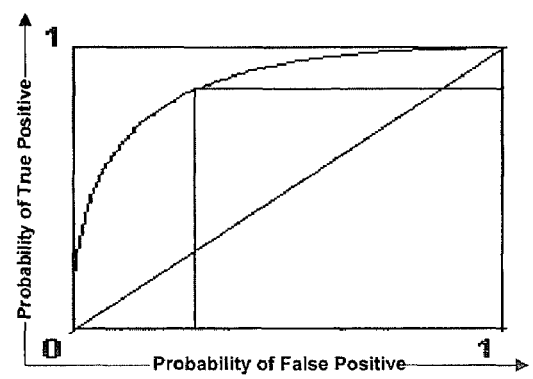
FIG. 4D is a graph illustrates another presentation of the curve of FIG. 4C where the horizontal axis represents the probability of a false positive and the vertical axis represents the probability of a true positive in accordance with some embodiments of the present invention.

To study the impact of the metric distribution on the classification model, the distribution of the metric may be studied based on both the normal and the abnormal network behavior. In other words, the metric may have two different distributions: one is based on the observation of the metric values during normal behavior and the other is based on the observation of the metric values during abnormal behavior. Using these distributions in comparing the probability of an observed value to indicate normal or abnormal behavior may be a factor used in any classification process. FIG. 4 illustrates the previous idea as follows:

- FIG. 4A illustrates the metric distribution based on normal behavior where the horizontal axis represents the possible values of the metric and the vertical axis represents the probability density function (PDF) of each value.
- FIG. 4B illustrates the metric distribution based on abnormal behavior.
- FIG. 4C combines the two different distributions of FIGS. 4A and 4B into a single graph. FIG. 4C is one of the curves used to represent the Receiver Operating Characteristics (ROC). Such a curve is used because of its ability to demonstrate the idea of the cutoff level, which is central to the ROC analysis. The cutoff level is a specific value of the metric that is used by the normal hypothesis to differentiate between the signal and the noise (the normal and the abnormal states in the given case).
- FIG. 4D illustrates another presentation of the ROC curve where the horizontal axis represents the probability of a false positive and the vertical axis represents the probability of a true positive. A point in the ROC curve represents a cutoff line in FIG. 4C.

Although the metric disintegration model is not a classification model, the previous methodology was adopted to show the value of the disintegration model to increase the relevancy of the network metric to the network behavior. The following variations may be introduced:

- Instead of the dual state (signal and noise), a third state is introduced, which is identified as the fuzzy state
- Instead of a single hypothesis, two hypotheses are introduced (normal and abnormal hypotheses), and so two cutoff lines are used.

The following states are proposed:
- The normal state satisfies the normal hypothesis.
- The abnormal state satisfies the abnormal hypothesis.
- The Fuzzy state is satisfied if neither the normal nor the abnormal hypotheses are satisfied.

According to Equation (1), the size of both $\Phi_{sn}$ and $\Phi_{sa}$ are defined in a deterministic manner based on the expertise of the network administrator. To define them based on the metric distributions, a value of $\alpha$ is selected to represent the confidence level. The variable $\alpha$ can take any positive real number between zero and one with the lower the value of $\alpha$, the higher the confidence level. Based on the value of $\alpha$, a classification decision can be made based on Equation (2).

$$x \in \phi_{sn} \Leftarrow \left( \frac{P_n(x) - P_a(x)}{P_n(x)} \geq (1-\alpha) \right) \quad (2)$$

$$x \in \phi_{sa} \Leftarrow \left( \frac{P_a(x) - P_n(x)}{P_a(x)} \geq (1-\alpha) \right)$$

where,
'x' represents a value of the given metric
$P_n(x)$ is the probability distribution of 'x' based on normal behavior
$P_a(x)$ is the probability distribution of 'x' based on abnormal behavior Based on Equation (2), the normal and the abnormal hypotheses can be defined as follows:

N (The Normal Hypothesis): 'x' satisfies the normal hypothesis if and only if $x \in \phi_{sn}$ when $\alpha \to 0$.

By selecting a value of $\alpha$ very close to zero, the percentage of false positives (misdetection) may be very small and the normal hypothesis may be reinforced.

A (The Abnormal Hypothesis): 'x' satisfies the abnormal hypothesis if and only if $x \in \phi_{sa}$ when $\alpha \to 0$.

By selecting a value of $\alpha$ very close to zero, we the percentage of false negatives (false alarm) may be very small and the abnormal hypothesis may be reinforced.

Note if neither the normal nor the abnormal hypotheses is satisfied, the null hypothesis is satisfied, which is the fuzzy state in the proposed case.

Figure 5:
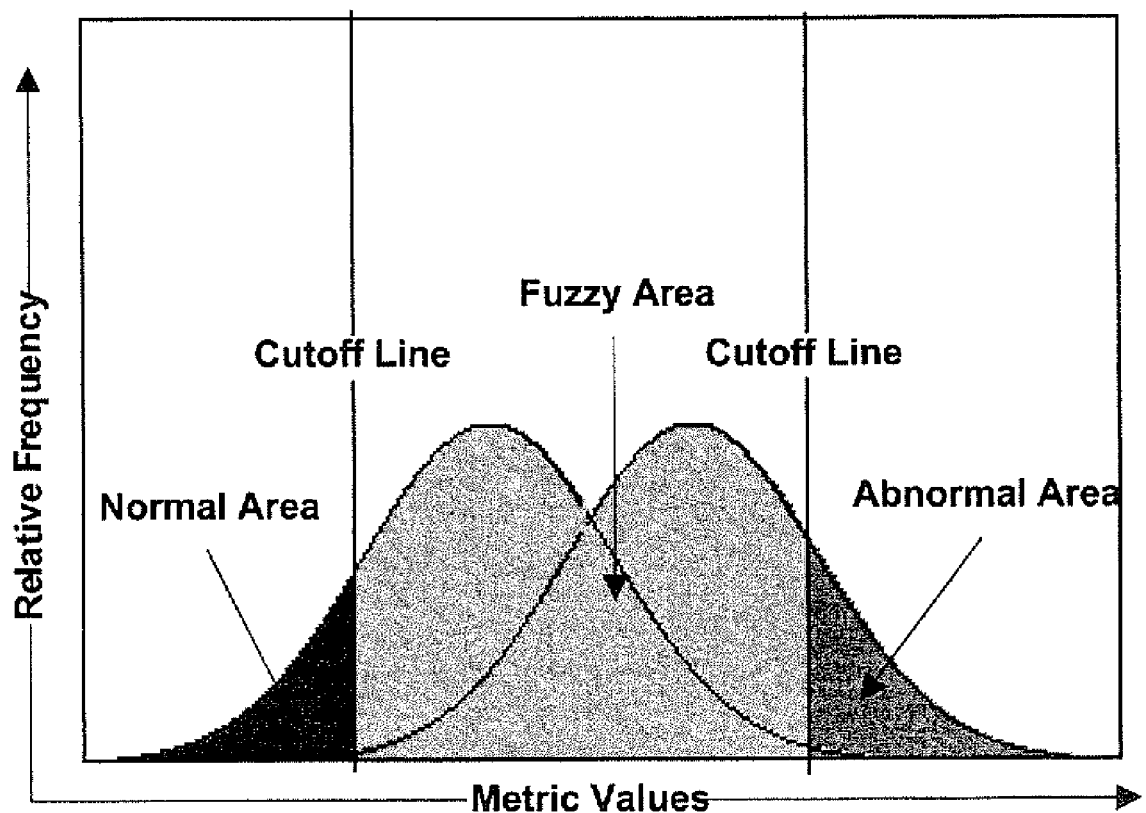
FIG. 5 is a graph that illustrates modifications to the graph of FIG. 4C in accordance with some embodiments of the present invention.

FIG. 5 illustrates modifications to the ROC curve in accordance with some embodiments of the present invention. The two hypotheses can be illustrated in FIG. 5 based on the cutoff lines.

Another observation from Equation (2) is the dependency of the sample space of both $\Phi_{sn}$ and $\Phi_{sa}$ on the following:

The distribution of the metric in the normal behavior [$P_n(x)$].

The distribution of the metric in the abnormal behavior [$P_a(x)$].

The confidence level ($\alpha$).

To increase the value of ($\eta$), a change in at least one of the previous three elements is needed, but because the value of ($\alpha$) cannot be changed based on the proposed hypotheses, the only remaining possibility is to change the distribution of the given metric ('x'); however, one does not have any control over the metric distributions; they can only be observed, collected, and/or retained. By introducing the metrics disintegration model a positive change can be introduced into the metrics distribution, which will reduce the size of the fuzzy area in FIG. 5.

Figure 6:
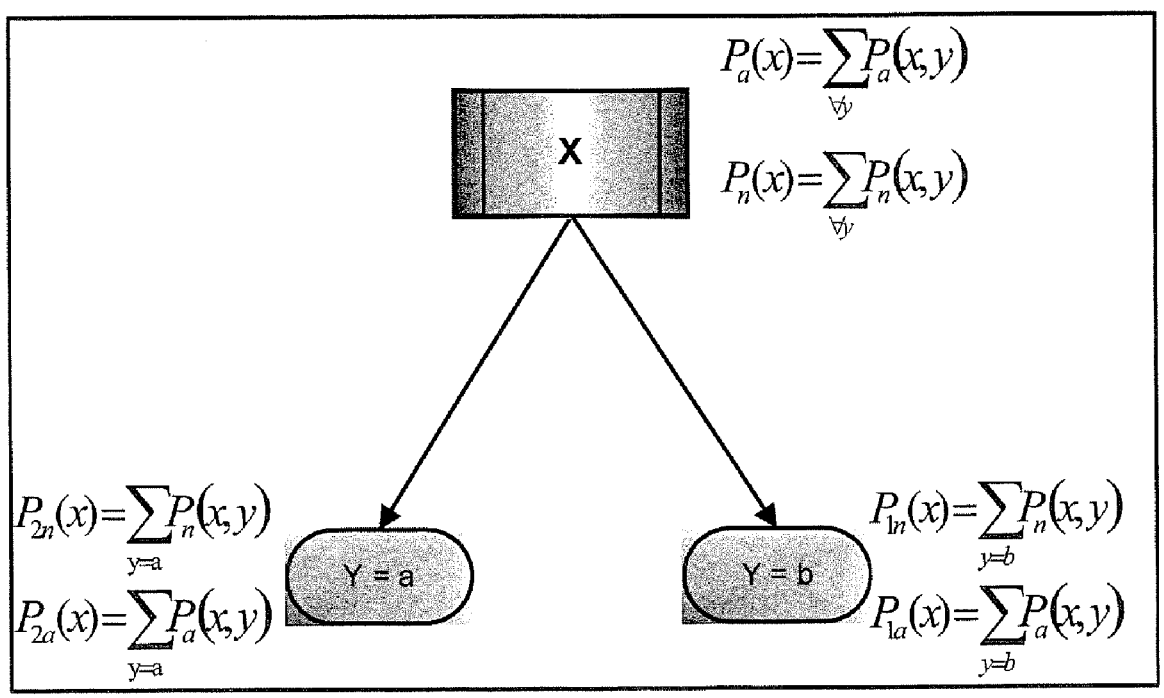
FIG. 6 is a block diagram that illustrates a metric disintegration tree in accordance with some embodiments of the present invention.

The metric disintegration model introduces a systematic and logical approach for proposing different distributions of the metric based on a tree of features. The new distribution may offer a positive impact on the distribution of the given metric resulting in a reduction in the size of the fuzzy area in FIG. 5. Instead of using a single random variable to represent the distribution of a given metric, the distribution of the metric 'x' can be a joint distribution $P_n(x,y)$ in the normal mode and $P_a(x,y)$ in the abnormal mode, where 'y' is a feature that impacts the distribution of the metric 'x'. For simplicity, assume the sample space of 'y' has only two values (a, b). The disintegration tree has three different nodes: A parent node and two children as illustrated in FIG. 6. The parent node represents the metric distribution before the disintegration as illustrated in Equation (3). The children nodes represent the metric distributions after the disintegration. For each value of 'y' a different distribution is proposed as illustrated in Equation (4) and Equation (5).

$$P_a(x) = \sum_{\forall y} P_a(x, y), \quad P_n(x) = \sum_{\forall y} P_n(x, y) \quad (3)$$

$$P_{1n}(x) = \sum_{y=a} P_n(x, y), \quad P_{1a}(x) = \sum_{y=a} P_a(x, y) \quad (4)$$

$$P_{2n}(x) = \sum_{y=b} P_n(x, y), \quad P_{2a}(x) = \sum_{y=b} P_a(x, y) \quad (5)$$

In the proposed model, the metric distribution may be disintegrated into several distributions. Such disintegration can be achieved by considering a feature that impacts the distribution of this metric and examining the metric distribution based on different values of this feature. As such, instead of studying one distribution of the metric, the disintegration model provides the ability to study another distribution at each level of the tree based on the value of the disintegrated feature. As such, each time the disintegration tree increases by one level, the probability of increasing the relevancy value ($\eta$) increases. To clarify this point, Equation (1) and Equation (2) can be revisited based on FIG. 6 as follows:

In the root level of FIG. 6, both the normal and the abnormal distribution will be examined based on the Normal and the Abnormal Hypotheses. As such, based on Equation (2), a subset of the sample space ($\Phi$) will be defined as normal forming what has been defined in Equation (1) as $\Phi_{sn}$. Similarly, the abnormal set ($\Phi_{sa}$) will be formed allowing calculation of the initial value of the relevancy ($\eta$). By examining a possible value of 'y' (say $\alpha$), and following the same procedure specified in Equation (1), several other possible values of 'x' can be identified to be normal or abnormal based on Equation (2) and the proposed hypothesis. And so, an increase in the size of $\Phi_{sn}$ and/or $\Phi_{sa}$ can be introduced resulting in increasing the value of the relevancy ($\eta$).

FIG. 3 shows the five different levels of the metric disintegration trees; each level corresponds to one of the categories described above. As illustrated in FIG. 3, each level may consist of several sub trees. The construction of the metrics disintegration trees may be performed in two different steps in accordance with some embodiments of the present invention. The first step is dealing with the definition of the nodes and the construction of the sub disintegration trees within each level. The second step is dealing with the construction of the metric disintegration tree for each metric in the first level.

In accordance with some embodiments of the present invention, the metric disintegration tree is divided into five different levels. Each of the five proposed levels goes through what may be referred to as the level construction phase. The target of the construction phase is to enable the network administrators to dig into the details of their network and to themselves the following two questions:

Is there any new behavioral element belonging to this class?

Is there any relationship between the newly discovered element and the elements discovered before in the same class?

The first question deals with the discovery of new elements based on the given classification for each level. The second question draws a parent-child relationship between the elements of the same class, which may be visually represented in a tree hierarchy. As such, for each level, the network administrators may go through several iterations until they conclude the elements and the relationship of the current level before moving to the next level. The retained elements and relationships may be used in the next phase to construct each metric disintegration tree.

The construction of the metric disintegration tree, in accordance with some embodiments of the present invention, may be performed in the following steps:

Select a new metric from the first level.

For each item in the subsequent levels, select a related item (feature) to the metric that can be used in the metric disintegration tree.

Mark this item in an inverse bitmap to indicate the relationship between the metric and the feature. The inverse bitmap is used for deciding the weight of each feature based on how many disintegration trees this features is used for.

Revisit each level and adopt the same methodology.

As described above, the NBAD module 74 may be configured to select metrics that have a sufficiently high relevancy to the behavior of the network. Based on the selected metrics, the NBAD module 74 may generate an Adaptive Exponentially Weighted Moving Average (AEWMA) with a moving centerline control chart to monitor changes in the network's behavior in accordance with some embodiments of the present invention.

EWMA is considered one of the optimal one step ahead forecasting methodlogies, and its equations in terms of forecast and forecast error can be represnented as follows:

$$F_t = \lambda x_t + (1-\lambda) F_{t-1} \quad (6)$$

where $\lambda$ is a weighting parameter
$F_t$ is the curent estimated value of the metric (x)

$$e_t = x_t - F_{t-1} \quad (7)$$

where $e_t$ is the forecasting error

Equation (6) can be rewritten in terms of past forecasts and forecast error as follows:

$$F_t = F_{t-1} + \lambda e_t \quad (8)$$

The efficiency of the forecast estimator in Equation (8) may be highly dependent on the choice of the selected weight parameter '$\lambda$'. Further, large deviations in '$e_t$' suggest that the performance of the forecast system has deteriorated. To handle this scenario, Equation (8) needs to be updated with an adaptive weight parameter, in accordance with some embodiments of the present invention, as follows:

$$F_t = F_{t-1} + \lambda_t e_t \quad (9)$$

Based on Equation (9), the effectiveness of the forecasting system may depend upon the selected value of the weight and the frequency of changing the weight parameter.

Tracking Signals (TS) may be used to monitor the accuracy of forecasting systems. Tracking Signals are generally classified into two forms: cumulative error tracking signals and smoothed error tracking signals. The smoothed error-tracking signal is the absolute ratio of weighted sum of all past one-step-ahead forecast errors, and the standard deviation of the one-step-ahead forecast errors, $MAD_t$. The value of the TS is sensitive to the performance of the forecast system, and it deviates from zero if the forecast is not optimal. The smoothed error-tracking signal may be represented as follows:

$$TS_t = \left| \frac{E_t}{MAD_t} \right| \quad (10)$$

where $$E_t = \beta e_t + (1-\beta) E_{t-1} \quad (11)$$

The standard deviation of the one-step-ahead forecast error is estimated using the mean absolute deviation (MAD), which is given by the following equation:

$$MAD_t = \beta |e_t| + (1-\beta) MAD_{t-1} \quad (12)$$

In the above equations $\beta$ is a smoothing constant, $0 < \beta < 1$. For MAD, $\beta$, may be chosen between about 0.05 and about 0.20. The rationale behind these statistics is to give more weight to the recent forecast errors than older ones by applying the exponential smoothing concept.

The TS does not, however, give significance to the direction of change, nor to the upper or lower limits of acceptability. To address this shortcoming, a successive sign test may be used on first differences of TS in accordance with some embodiments of the present invention.

$$\nabla TS_t = TS_t - TS_{t-1} \quad (13)$$

where $\nabla$ is the backward difference operator.

By using Equation (13) the end of either the normal behavior or the abnormal behavior period may be approximated in accordance with some embodiments of the present invention. A signal may be fired if $\nabla TS_t$ in Equation (13) switches sign. This statistical test is analogous to the first derivative test for finding the inflection points of a continuous differentiable function. It exploits the characteristic of $\nabla TS_t$ in that it eventually "forgets" about the past large errors once the forecasting system returns to normal accuracy. Consecutive firing rules may be used to guard against false alarms due to process disturbances and measurement error.

To estimate the optimal value of '$\lambda$' and to improve the accuracy of the predictor, a number of adaptive methods have been proposed. The most representative and widely used method for formulating '$\lambda_t$' is to use '$TS_t$' as in Equation (10). As clarified in Equation (10), '$\lambda_t$' will vary based on variations in the observation patterns. If $E_t$ and $MAD_t$ are equal, this means that Equation (10) forecasts in such a way that there is no obvious bias of over or under estimation. A potential shortcoming of this adaptive method, however, is the possibility of an overreaction to changes in the data in such a way that random fluctuations are mistakenly identified as changes in the observation pattern, which may results in a poor forecast. To address this potential shortcoming, changes to the weight parameter '$\lambda$' may be made based on the flowchart of FIG. 7.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Operations begin at block 505 where an Out of Control flag is set to false. This indicates that the particular network metric x is initially presumed not to have a value that falls outside upper and lower control limits, which are described in detail below. At blocks 510 and 515, the NBAD module 74 observes enough values of the metric x to construct ($F_t$) and the upper and lower control limits. After reaching stable value for ($F_t$), a current value for the monitored metric x is obtained at block 520 and the current value is compared to the upper and lower control limits at block 525. If the current value for the monitored metric x falls outside of the upper and lower control limits and the Out of Control Flag is currently false as determined at block 530, then the Out of Control flag is set to true at block 535 and the start of the abnormal network behaviour period is recorded at block 540. If the Out of Control flag is set to true at block 530, then operations continue at block 520.

Alternatively, if a current value for the monitored metric x does not fall outside the upper and lower control limits as determined at block 525, then if the Out of Control Flat is set to true as determined at block 545 it is set to false at block 550 to signify the end of the period of abnormality at block 555. Operations continue at block 560 where the Tracking Signal difference operator $\nabla TS_t$ is calculated at the end of every time period and a check is made to determine if there has been a change in the sign of this difference operator. If there is a change in the sign of the difference operator, then the weight parameter is updated according to Equation (10) at block 565, while restricting its value between zero and two in accordance with some embodiments of the present invention.

Operations continue at block 570 where the weight parameter is optimized around the target. The error term 'e$_t$' in the Equation (7) may be minimized to optimize the forecast as described in the following equations:

$$F_{tp} = \lambda_{tp} e_t + F_{tp-1}$$

$$F_t = \lambda_t e_t + F_{t-1}$$

$$F_{tm} = \lambda_{tm} e_t + F_{tm-1} \qquad (14)$$

where $\lambda_{tp} = (\lambda_t + \delta)$ and $\lambda_{tm} = (\lambda_t - \delta)$ $F_{t-1}$ is the predicted current state of the monitored metric x, while the values $F_{tp-1}$ and $F_{tm-1}$ are used to verify the sensitivity around the optimal forecast.

$$e_{tp} = (x_t - F_{tp-1})$$

$$e_t = (x_t - F_{t-1})$$

$$e_{tm} = (x_t - F_{tm-1}) \qquad (15)$$

An optimal $\lambda_t$ {$\lambda_{tp}$ or $\lambda_t$ or $\lambda_{tm}$} may be obtained by comparing above three prediction error terms and the selected optimal $\lambda_t$ should minimize the error in Equation (15) in accordance with some embodiments of the present invention. Various values of $\delta$ {0.25, 0.20, 0.15, 0.10, 0.05, 0.03, 0.00} have been tested and it has been observed $\delta=0.03$ performed generally performed the best.

Figure 8:
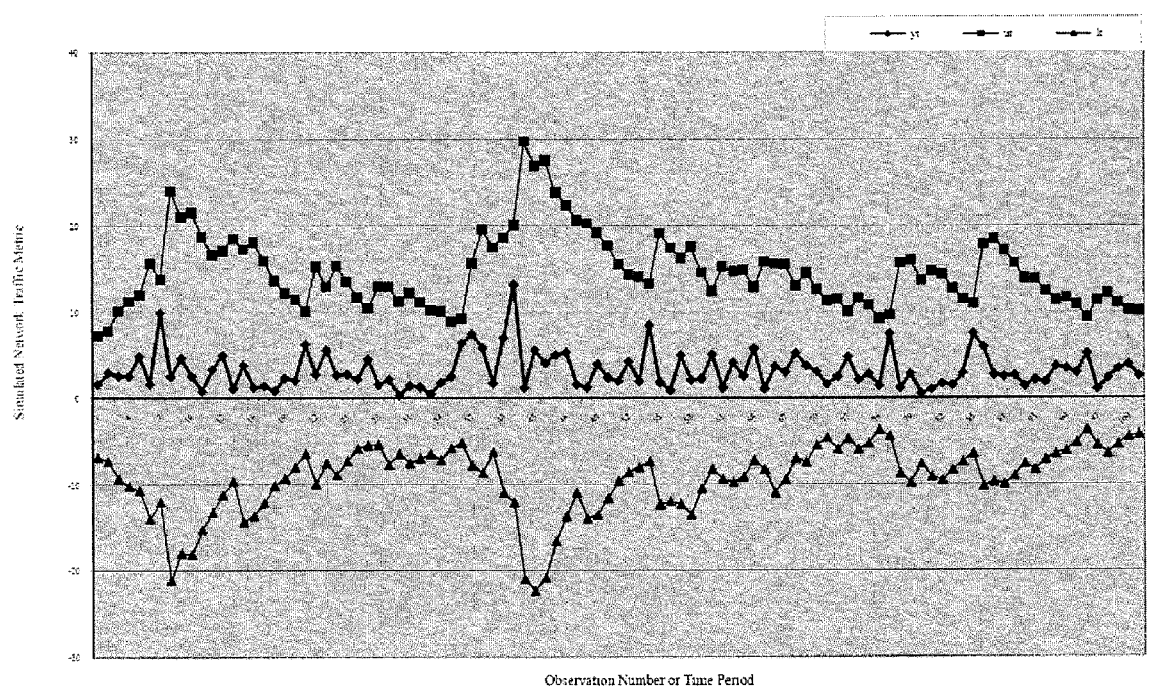
FIG. 8 is a graph that illustrates tolerance bands (upper and lower control limits) for an Adaptive Exponentially Weighted Moving Average (AEWMA) control chart in accordance with some embodiments of the present invention.

FIG. 8 illustrates the variation of the AEWMA control chart based on the embodiments discussed above. Based on the AEWMA forecast, the current observation of selected metric will be compared with the tolerance band to flag the network behavioral change. The tolerance band is the optimal forecast plus multiples of predicted deviation. The plot of tolerance band resembles a moving centerline chart, which is depicted in FIG. 8.

The confidence bands may be determined as follows:

The one step predicted deviation is calculated as follows:

$$d_t = \gamma |x_t - F_{t-1}| + (1-\gamma) d_{t-1} \qquad (19)$$

Where ($d_t$) is the predicted deviation, ($x_t$) is the observed metric, ($F_t$) is the predicted value metric and $\gamma$ is a weight constant.

Although $\gamma$ may theoretically take any value in the range $0<\gamma<1.0$, the values in the range 0.03 to 0.10 may provide improved performance.

The adaptive upper control limit, $UCL_t$ and lower control limit, $LCL_t$ at time t are calculated as:

$$F_{t-1} \pm K_{TS} d_{t-1} \qquad (20)$$

where $K_{TS}$ is multiplication constant.

Figure 7:
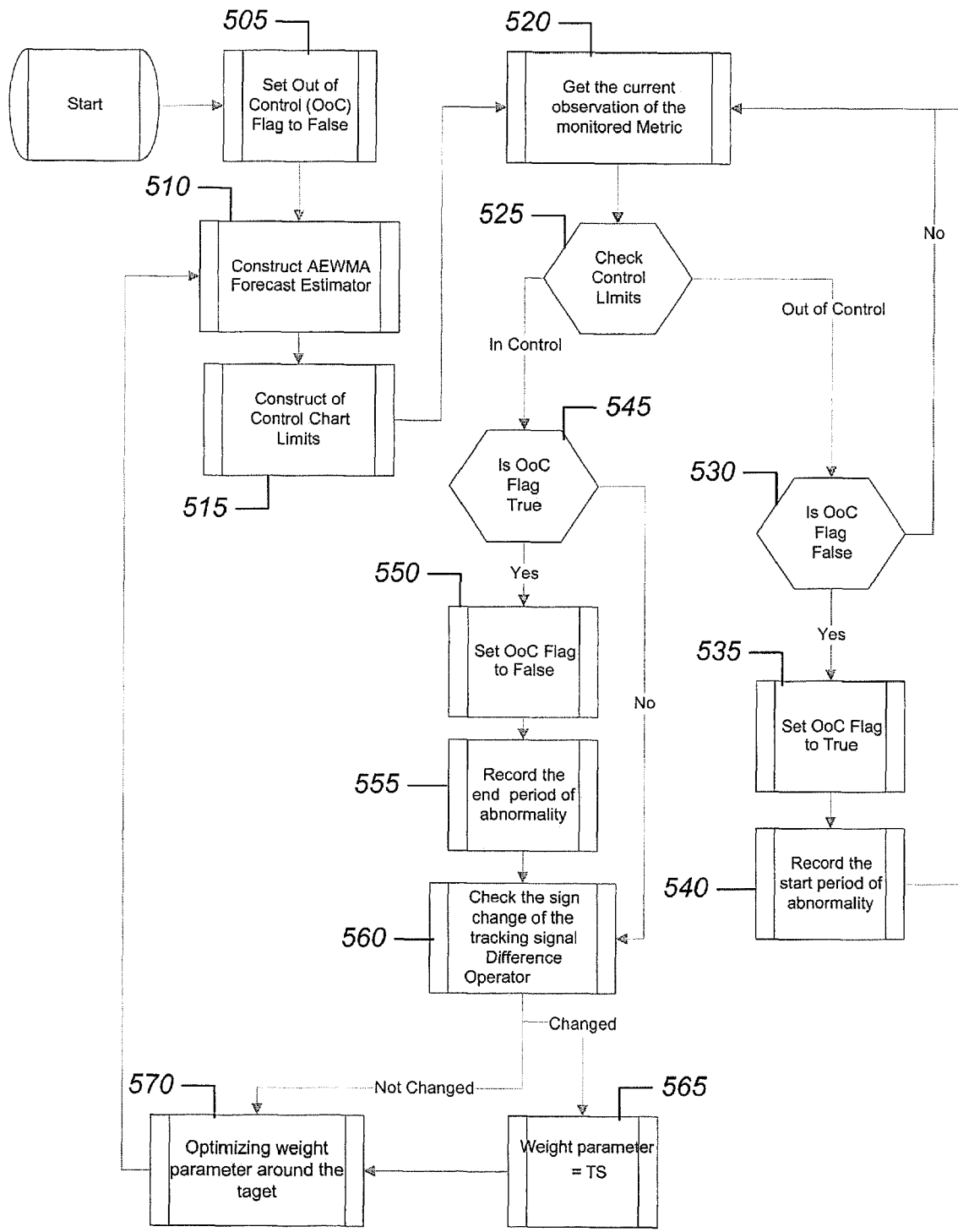
FIG. 7 is a flowchart that illustrates operations for tracking network behavioral changes in accordance with some embodiments of the present invention.

The flowchart of FIG. 7 show the architecture, functionality, and operation of exemplary implementations of the software modules and data used in some embodiments of the present invention. In this regard, each block may represent a module, segment, or portion of code, which comprises one or more executable instructions for implementing the specified logical function(s). It should also be noted that in some alternative implementations, the functions noted in the blocks may occur out of the order noted in FIG. 7. For example, two blocks shown in succession in FIG. 7 may be executed substantially concurrently or the blocks may sometimes be executed in the reverse order, depending upon the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of extracting a communication network behavioral metric based on a relevancy of the metric to network behavior, comprising:

performing operations as follows on at least one processor:

measuring a network behavior quantitatively over a period of time to obtain quantitative measurements;

identifying a network metric x that is defined as a random variable that represents the quantitative measurements;

selecting a network feature;

generating a metric disintegration model for the network metric x comprising at least one normal behavior probability distribution function for the metric x for each value of the network feature, respectively, and at least one abnormal behavior probability distribution function for the metric x for each value of the network feature, respectively;

increasing a number of the values of the metric x that indicates normal network behavior and/or abnormal network behavior based on the metric disintegration model; and selecting the network metric x as a behavioral metric based on a relevancy $\eta$ of the network metric x to the network behavior;

wherein the relevancy η given as follows:

$$\eta = \frac{|\Phi_{sn}| + |\Phi_{sa}|}{|\Phi|}$$

Φ is a sample space of all possible values of x;
$\Phi_{sn}$ is a subset of Φ based on the values of x that indicates normal network behavior;
$\Phi_{sa}$ is a subset of Φ based on the values of x that indicates abnormal network behavior.

2. The method of claim 1, wherein the network metric x is selected from one of a plurality of metric categories comprising volume of network activity metrics, network performance characteristic metrics, network fault metrics, network element activity log metrics, and/or user audit log metrics.

3. The method of claim 2, wherein the network feature is selected from one of a plurality of feature categories network specific features, network independent features, network exterior behavioral element features, and time machine features.

4. The method of claim 3, further comprising:
analyzing the network and its interfaces with external neighbors to identify behavioral elements;
assigning each of the identified behavioral elements to one of the plurality of metric categories and/or plurality of feature categories; and
identifying any parent-child relationships between behavioral elements in each of the plurality of metric categories and plurality of feature categories.

5. The method of claim 4, further comprising:
for each behavioral element in the plurality of metric categories examining each of the behavioral elements in each of the plurality of feature categories to determine if the examined feature category behavioral element can be used in the metric disintegration model for that metric category behavioral element.

6. A system for extracting a communication network behavioral metric based on relevancy of the metric to network, comprising:
a processor; and
a memory coupled to the processor and having computer readable program code stored therein, the computer readable program code comprising:
a Network Behavior Anomaly Detection (NBAD) module that is configured to measure a network behavior quantitatively over a period of time to obtain quantitative measurements, identify a network metric x that is defined as a random variable that represents the quantitative measurements, select a network feature, generate a metric disintegration model for the network metric x comprising at least one normal behavior probability distribution function for the metric x for each value of the network feature, respectively, and at least one abnormal behavior probability distribution function for the metric x for each value of the network feature, respectively, increase a number of the values of the metric x that indicates normal network behavior and/or abnormal network behavior based on the metric disintegration model, and select the network metric x as a behavioral metric based on a relevancy η of the network metric x to the network behavior;
wherein the relevancy η is given as follows:

$$\eta = \frac{|\Phi_{sn}| + |\Phi_{sa}|}{|\Phi|}$$

Φ is a sample space of all possible values of x;
$\Phi_{sn}$ is a subset of 101 based on the values of x that indicates normal network behavior;
$\Phi_{sa}$ is a subset of Φ based on the values of x that indicates abnormal network behavior.

7. The system of claim 6, wherein the network metric x is selected from one of a plurality of metric categories comprising volume of network activity metrics, network performance characteristic metrics, network fault metrics, network element activity log metrics, and/or user audit log metrics.

8. The system of claim 7, wherein the network feature is selected from one of a plurality of feature categories network specific features, network independent features, network exterior behavioral element features, and time machine features.

9. The system of claim 8, wherein the NBAD module is further configured to analyze the network and its interfaces with external neighbors to identify behavioral elements, assign each of the identified behavioral elements to one of the plurality of metric categories and/or plurality of feature categories and identify any parent-child relationships between behavioral elements in each of the plurality of metric categories and plurality of feature categories.

10. The system of claim 9, wherein the NBAD module is further configured to, for each behavioral element in the plurality of metric categories, examine each of the behavioral elements in each of the plurality of feature categories to determine if the examined feature category behavioral element can be used in the metric disintegration model for that metric category behavioral element.

* * * * *

UNITED STATES PATENT AND TRADEMARK OFFICE
CERTIFICATE OF CORRECTION

PATENT NO.        : 8,028,061 B2                                    Page 1 of 1
APPLICATION NO.   : 11/874722
DATED             : September 27, 2011
INVENTOR(S)       : Battisha et al.

It is certified that error appears in the above-identified patent and that said Letters Patent is hereby corrected as shown below:

In the Patent:

Column 3, Line 11, equation: Please correct " $F_{tn} = \lambda tne_t + F_{tn-1}$ "

to read -- $F_{tn} = \lambda_{tn} e_t + F_{tn-1}$ --

In the Claims:
Column 18, Claim 6, Line 21: Please correct "subset of 101 based on"
to read -- subset of $\Phi$ based on --

Signed and Sealed this
Thirteenth Day of March, 2012

David J. Kappos
*Director of the United States Patent and Trademark Office*